(12) United States Patent
Koskinen

(10) Patent No.: US 9,788,251 B2
(45) Date of Patent: Oct. 10, 2017

(54) DEVICES, METHODS AND COMPUTER PROGRAM PRODUCTS FOR AN IMPROVED HANDOVER IN INTER-SITE CARRIER AGGREGATION SCENARIOS

(75) Inventor: Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 64 days.

(21) Appl. No.: 14/388,455

(22) PCT Filed: Mar. 30, 2012

(86) PCT No.: PCT/EP2012/055848
§ 371 (c)(1),
(2), (4) Date: Sep. 26, 2014

(87) PCT Pub. No.: WO2013/143613
PCT Pub. Date: Oct. 3, 2013

(65) Prior Publication Data
US 2015/0055621 A1    Feb. 26, 2015

(51) Int. Cl.
*H04W 36/18* (2009.01)
*H04W 36/02* (2009.01)
(Continued)

(52) U.S. Cl.
CPC .......... *H04W 36/18* (2013.01); *H04W 36/026* (2013.01); *H04W 76/04* (2013.01); *H04W 92/20* (2013.01)

(58) Field of Classification Search
None
See application file for complete search history.

(56) References Cited

U.S. PATENT DOCUMENTS

2010/0184438 A1    7/2010  Wu ............................... 455/436
2011/0134774 A1*  6/2011  Pelletier .............. H04W 52/365
                                                                  370/252
(Continued)

FOREIGN PATENT DOCUMENTS

GB           2479534 A      10/2011
WO     WO 2011/100673 A1     8/2011

OTHER PUBLICATIONS

3GPP TR 36.814, V9.0.0 (Mar. 2010), "$3^{rd}$ Generation Partnership Project; Technical Specification Group Radio Access Network; Evolved Universal Terrestrial Radio Access (E-UTRA); Further Advancements for E-UTRA physical layer aspects (Release 9)", 104 pgs.

*Primary Examiner* — Kouroush Mohebbi
(74) *Attorney, Agent, or Firm* — Harrington & Smith

(57) ABSTRACT

A handover process is proposed in a carrier aggregation scenario, in which there is encompassed a device communicating with a terminal in association with at least another device, using at least two carriers. At least a first carrier towards the terminal is established from the at least one another device and at least a second carrier is established towards the terminal from the device. A control module of the device is configured to suspend ongoing traffic between the device and the terminal on the second carrier, perform re-establishment of one or more protocol entities communicating over bearers between the device and the terminal on the second carrier, and resume traffic between the device and the terminal on the second carrier. The suspending is triggered by a first instruction received from a first one of the at least one another device, and the resuming is triggered by a second instruction received.

15 Claims, 4 Drawing Sheets

(51) Int. Cl.
*H04W 76/04* (2009.01)
*H04W 92/20* (2009.01)

(56) References Cited

U.S. PATENT DOCUMENTS

| 2012/0044812 | A1  | 2/2012 | Hiddink et al. | 370/241 |
|---|---|---|---|---|
| 2012/0082107 | A1* | 4/2012 | Ou ............... H04W 74/0833 | 370/329 |
| 2012/0106511 | A1* | 5/2012 | Wu ............... H04W 76/064 | 370/331 |
| 2014/0133477 | A1* | 5/2014 | Siomina ......... H04W 56/0055 | 370/350 |

* cited by examiner

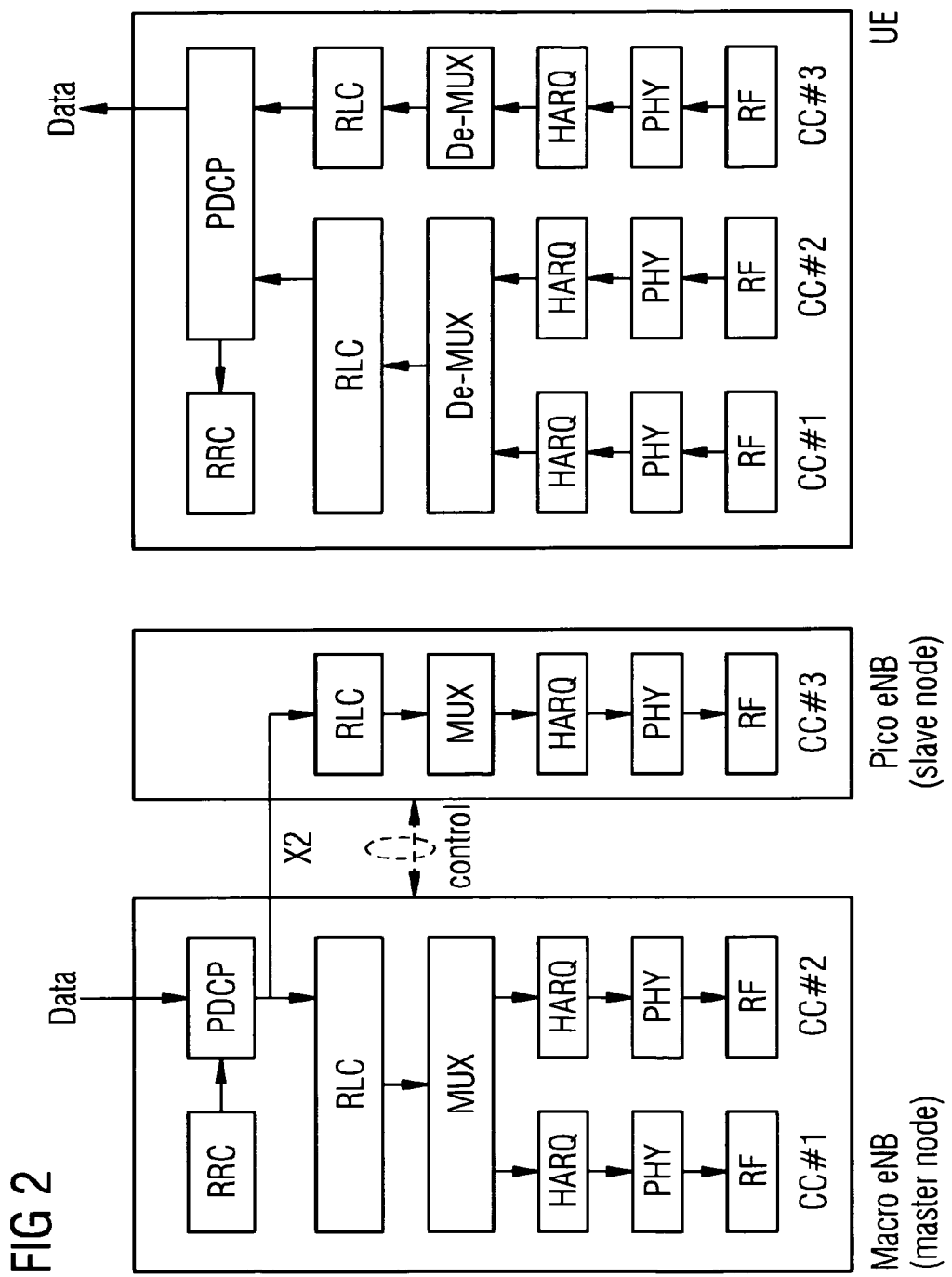

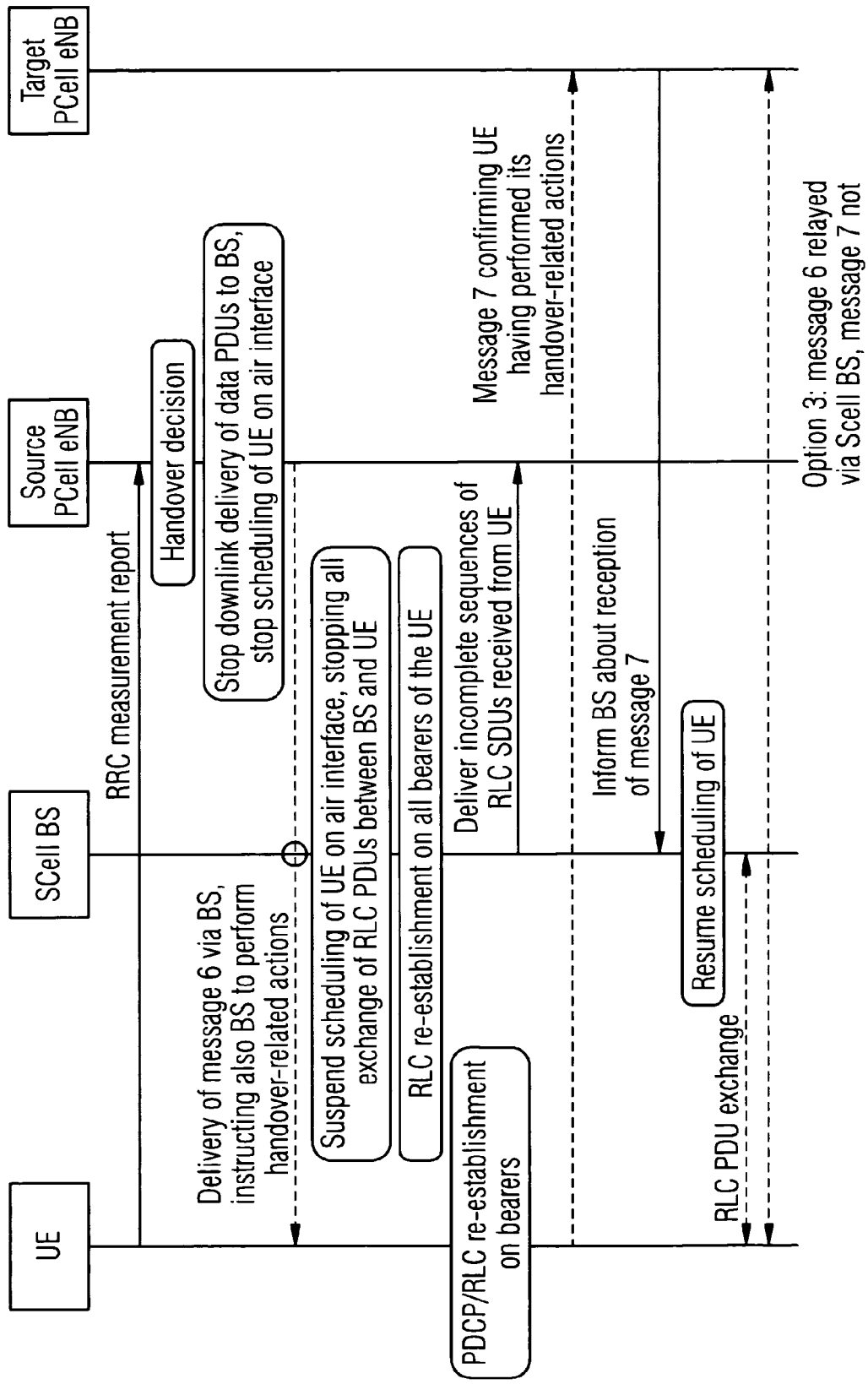

DEVICES, METHODS AND COMPUTER PROGRAM PRODUCTS FOR AN IMPROVED HANDOVER IN INTER-SITE CARRIER AGGREGATION SCENARIOS

FIELD OF THE INVENTION

The present invention relates to devices, methods and computer program products for an improved handover in inter-site carrier aggregation scenarios. In particular, the present invention relates to such devices, methods and computer program products applicable in mobile communication systems operating based on carrier aggregation, in which a primary cell/carrier is relocated during a handover in an inter-site carrier aggregation scenario.

BACKGROUND

Mobile data transmission and data services are constantly making progress. With the increasing penetration of such services, a terminal apparatus such as a user equipment UE (or mobile station MS, or the like; different names may apply for respective different standards) is capable of communicating using multiple frequencies or frequency bands and accessing various services. Data throughput is becoming more and more important in view of an increasing amount of data to be conveyed or carried for those services. According to one aspect to increase data throughput, a terminal UE is supplied or served from e.g. plural sources (sites) (e.g. bases stations BS or NodeB's, NB or evolved NodeBs, eNB) using plural carriers in carrier aggregation (CA). This is also referred to as inter-site carrier aggregation if the carriers are provided via distinct sites (in contrast to intra-site carrier aggregation in which one site, e.g. eNB, aggregates the plural carriers "alone").

In the following, aspects of the invention will be exemplarily described. In order to enhance legibility and understandability of the invention, for explanatory purposes only, reference is made to the communication system of LTE or LTE-A (Long Term Evolution, LTE-Advanced). However, reference to such specific system and using of specific signaling names or channel names is not intended to limit the present invention to those specific examples. Rather, the principles of the present invention can be transferred to any other communication system adopting different channel/signaling names as LTE/LTE-A.

Along with the development of LTE system, high-speed data service has been treated as one of the most important requirements. Especially for local area network, higher data rate is expected from user's perspective. How to provide local service with high speed data rate has become a hot topic in 3GPP ($3^{rd}$ Generation Partnership Project).

LTE-LAN (LTE-Local Area Network) is a research activity to compete with world-wide popular WiFi© or WLAN (Wireless Local Area Network) technique. LTE-LAN is basically assumed to be based on LTE technology, but is more focused on some local area use cases and scenarios. LTE-LAN is expected to provide high performance service for users with low cost, and is expected to become a competitor to WiFi©.

Applicant is involved in investigating in such area, with a focus on potential LTE local area architectures as one of plural research topics. One of the most promising local area concepts identified in such preliminary works is the architecture based on the LTE-LAN (which is currently referred to as "LTE Hi-concept").

Basic assumptions in this concept are:
Dual band operation in that local area and wide area accesses are using different radio bands,
Autonomous (local area) operation to mobile core network in that the usage of LTE-LAN network is transparent to a core network for simplicity and for keeping the signaling load low,
Offloading of LTE wide area network resources (EPS (Evolved Packet System) Bearer Services) to use LTE-LAN network resources in control of the serving eNB of the UE at E-UTRAN level (Evolved Universal Terrestrial Radio Access Network).

At the moment, in 3GPP Rel-12 and above there is also some interest in studying Inter-Site Carrier Aggregation with LTE, where a Primary Component Carrier (PCC, PCell primary Cell) is transmitted via e.g. a macro eNB and one or more Secondary component carriers (SCCs, SCells or Secondary Cells) is transmitted via e.g. one or more pico eNBs. Note that as used herein below 'PCell/eNB' is designated to denote a primary eNB and 'SCell BS' is designated to denote a secondary base station, and so on, as also the primary node may provide also SCells in Rel-10 fashion alongside those provided from the secondary node(s). Thus, there is only one Pcell for the UE. Apart from that, any base station can transmit several SCells to that UE. "Inter-site" thus means that at least one SCell is not co-sited with the PCell.

In general, the mentioned "LTE-Hi concept" may support Inter-Site and "multi-radio" CA, where a serving eNB is in a role of a primary cell, PCell, and "LTE-Hi" Access Points (APs) are each in a role of a respective secondary cell, SCell.

In the LTE-LAN or Inter-Site CA concepts targeted for 3GPP Rel-12, a terminal UE may move within the network coverage, so that there may be situations in which a current SCell (the pico cell or the LTE-LAN AP) has proper signal but the Serving macro eNB or the PCell is not any longer anymore the best cell. This will necessitate in an Inter eNB handover/PCell Relocation procedure to be carried out.

Though, so far in the context of Inter Site CA studies, there have not been any discussions known by the inventors about such a scenario, because the CA scenario considered in 3GPP so far are assuming PCell and SCell being controlled by the same eNB (Intra-site CA).

In 3GPP standardization, the Inter Site Carrier Aggregation is not supported before the coming Rel-12 due to an assumption that a backhaul link (the X2 interface) between eNBs has constraints in terms of latency and capacity (3GPP TR 36.814). For such reason, inter-site CA remained unconsidered (omitted) so far.

A reason for this is that the current Intra Site Carrier Aggregation is supposed to happen at the radio link layer (below RLC in LTE radio stack), so that the fast radio control loop on all the CCs must be terminated at the primary eNB. Thus, it has not been feasible to consider relocation of only a subset of a UE's serving cells so far, but CA mobility is assumed to be handled by removing/adding secondary CC(s) in conjunction with Inter PCell handover procedures, i.e. (at first) terminate CA operation temporarily (terminate any secondary carriers/cells) and then, if possible, restart CA and the secondary carriers/cells after the PCell handover was executed.

Thus, carrier aggregation is not maintained during intersite HO, an increased signaling load is involved to terminate/restart the secondary carriers/cells, and it is unsure whether the SCCs/SCells can be reactivated after HO.

Thus, there is still a need to further improve such systems in relation to handover in inter-site carrier aggregation scenarios, and hence a need to provide improved devices, methods and computer program products for a corresponding handover procedure for inter-site carrier aggregation scenarios.

SUMMARY

Various aspects of examples of the invention are set out in the claims.

According to a first aspect of the present invention, there are provided respective devices as defined in claims 1, 5, and 7, respectively.

According to a second aspect of the present invention, there are provided respective methods as defined in claims 8, 12, and 14, respectively.

Advantageous further developments of the respective devices/methods are as set out in respective dependent claims.

According to a third aspect of the present invention, there are provided, as defined in claims 15, 16, and 17, respectively, computer program product(s) comprising computer-executable components which, when the program is run on a computer, are configured to perform the method aspects as indicated above. The above computer program product/products may be embodied as a computer-readable storage medium.

It is thus proposed, according to at least exemplary aspects of the invention, a new procedure and correspondingly configured devices which is/are at least beneficial in regard to the following:
- an Inter-Site eNB handover/PCell relocation is enabled such that a secondary eNB can remain configured to provide one or more SCells towards the UE (after HO) without interruption;
- the procedure for PCell Relocation enables to maintain the configuration of serving cells provided by the secondary eNB unaltered, like e.g. shown in the FIG. 1;
- the procedure supports relocating the "associated macro eNB" (PCell) while a terminal UE has dual-radio connectivity by using LTE and LTE-LAN radio;
- the procedure/architecture supports a primary eNB to control the resources of a secondary eNB and to pass user-plane data accordingly via a common interface between a primary eNB and Local Area Access Point, the interface representing a backhaul interface supporting X2/S1 like functions;
- the presented PCell relocation procedure is for example particularly feasible in Inter-Site Carrier Aggregation by using Carrier Aggregation where data flows are split already at Layer Three i.e. in between RLC and PDCP in the LTE radio stack, like for example shown in FIG. 2;
- the active backhaul interface can be switched in such scenario to its new route from a secondary/LA BS to a new (target) macro eNB without altering the radio secondary component carrier (CC) connection in between the UE and a secondary base station;
- the radio handover from the source PCell to the target PCell and the said backhaul-interface path switching is time-organized so that the procedure is seamless without causing packet loss, un-necessary delay or service worsening, and
- the losslessness of AM RLC data transmissions is assured by proper stop/resume mechanisms by the eNBs involved in connection with the handover/PCell relocation.

BRIEF DESCRIPTION OF DRAWINGS

For a more complete understanding of example embodiments of the present invention, reference is now made to the following descriptions taken in connection with the accompanying drawings in which:

FIG. 2 illustrates radio-protocol stacks in inter-site carrier aggregation with a flow splitting at Layer 3.

FIG. 4 illustrates an example of a modified signaling according to an aspect of the invention

DESCRIPTION OF EXEMPLARY EMBODIMENTS

Figure 1B:
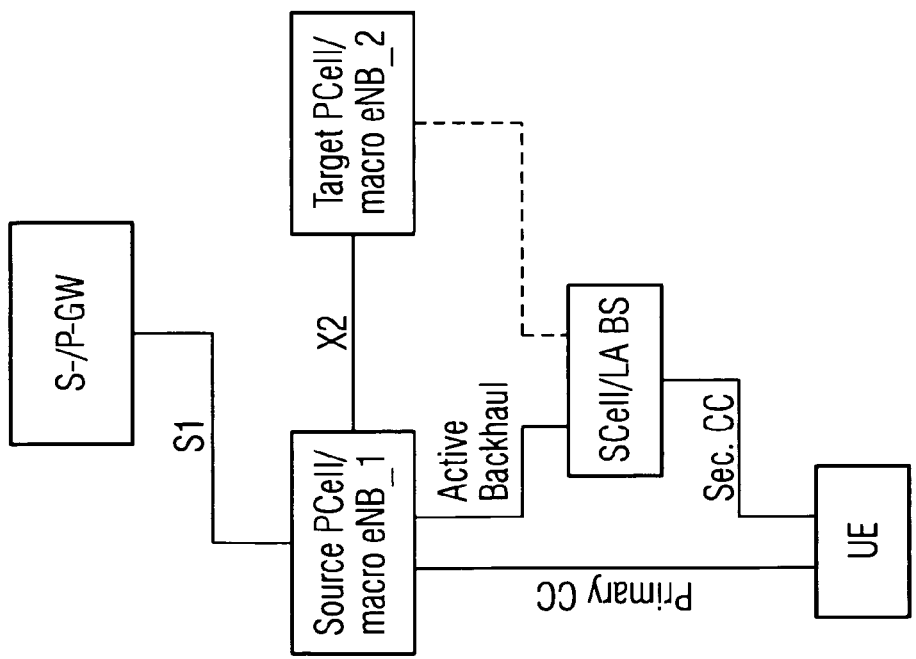
FIG. 1 illustrates a scenario of inter-site carrier aggregation and the entities/interfaces involved prior to (FIG. 1 a) and after (FIG. 1b) handover.

Exemplary aspects/embodiments of the invention will be described herein below.

For better understanding of subsequent aspects of the invention, it is noted that in his projects, applicant has already made a couple of associated macro eNB relocation procedure proposals. Those are or were based on an assumption that a handover on the primary radio connection and the macro eNB-LTE-LAN AP backhaul interface path switching for the secondary connection should be executed in two phases, i.e. assuring first that the inter macro eNB handover is executed successfully, and only after that perform the said backhaul interface path switching for the "secondary carrier (s)" for possible offloaded or aggregated EPS bearers.

This is a quite natural initial thinking as the primary radio connection via the PCell is seen more important to be maintained also in the failure cases, and one easily concludes to make a trade between robustness and overall performance.

However, here it should be noted that such two phase procedure does not increase robustness in case an Inter-eNB handover failure will occur. This is because the terminal UE may have no possibility to return back to the source PCell/eNB in which radio link quality was fading. Rather, it must perform a new RRC-connection/Service Request procedure to the best received Cell, and previous "old" UE context data become deleted in the source Primary eNB. Then, after an Inter-eNB handover failure, the source PCell simply cannot continue serving the former "secondary carrier(s)" and thus the robustness does not become any better by using the proposed two phase solution.

In applicant's conceptual work, there is assumed Inter-Site CA, with data split among the sites done within the air-interface protocol stack, and where a fast radio control loop for the secondary carrier component is terminated at the secondary base station. This solution enables less stringent latency requirement in the backhaul between the primary and the secondary base stations in order to support Inter Site CA.

The subsequently outlined PCell relocation procedure is feasible at least in the context of Inter Site Carrier Aggregation where data flow split happens already at Layer Three (L3), i.e. in between RLC and PDCP in the LTE radio stack like shown in FIG. 2. Though, this is not a pre-requisite for the proper functioning of the example embodiments of the present invention.

FIG. 2 shows a master node (serving eNB incl. primary CC), a slave node (secondary eNB incl. secondary CC), and a terminal UE. For substantially each of those nodes, the protocol stack comprises: the packet data convergence protocol, PDCP, at which data are received (for the master node), and below which the data are split prior to being supplied to radio link control, RLC. Below RLC normal LTE MAC-protocol functionality takes place i.e. multiplexing MUX is performed and data are supplied to the hybrid automatic repeat request HARQ stack level, followed by the physical layer PHY, the rafio frequency RF part, which establishes the respective component carriers CC. Control data between master and slave node are exchanged via X2 interface over the X2AP protocol, independent from the shown air-interface protocol stack. Substantially the same applies for the terminal UE, with the exception that downlink data flow through the stack levels is reversed, and e.g. multiplexing is replaced by de-multiplexing, and data flow splitting is replaced by data flow combining at layer three, i.e. between RLC and PDCP.

In the LTE-LAN and Inter Site CA concepts, it is common that the Serving eNB and the secondary eNB or base station have a backhaul interface supporting X2/S1 like functions in order to let the master node control or at least request for the slave node's resources and to pass user-plane data accordingly.

Figure 1A:
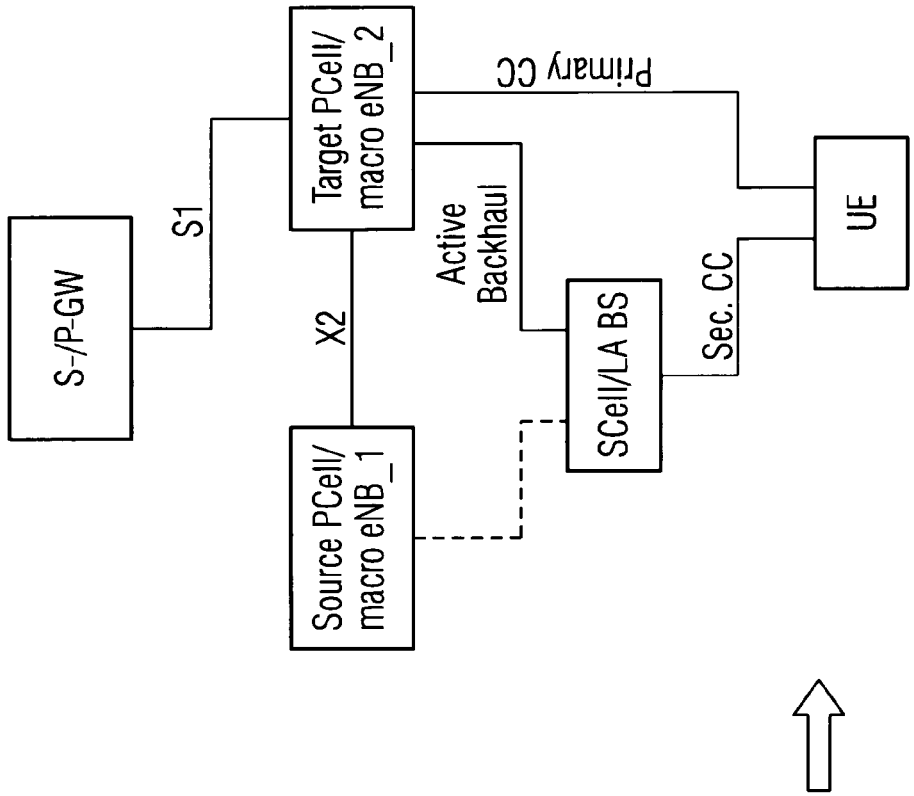

FIG. 1 illustrates a scenario of inter-site carrier aggregation and the entities/interfaces involved prior to (FIG. 1 a) and after (FIG. 1b) handover. Entities or apparatuses involved are as follows for FIGS. 1a and 1b.

A terminal UE, a source primary eNB such as e.g. a macro eNB #1, a secondary eNB or base station such as e.g. a pico eNB, and a target primary eNB such as a macro eNB #2.

The terminal in CA mode has established a primary component carrier PCC towards the serving eNB (eNB #1 before HO, eNB #2 after HO), and at least one secondary component carrier SCC towards secondary eNB or base station. The secondary eNB has a backhaul interface towards each of the (potential) primary eNBs. The backhaul interface towards the serving primary eNB is denoted as active backhaul interface. The (potential) primary eNBs #1 and #2, respectively, interface each other via an X2 interface.

As shown in FIG. 1b, after (and during) HO, the secondary component carrier SCC from the terminal remains the same towards the secondary eNB as before HO. However, the active backhaul interface from the secondary eNB has changed to be towards the new serving primary i.e. target eNB #2, denoted as active backhaul interface in FIG. 1b.

The invention is implemented in, at least under an exemplary aspect,
an apparatus such as an eNB, and comprises a device according to an aspect of the invention. Such device can be a chip or chipset, or a subunit of the apparatus, or the like. The device comprises at least a memory module, MEM, in which software code portions and/or data is stored or are stored. The memory module is connected to a control module ctrl such as a processor, or CPU, or ASIC. The control module is connected to a transceiver module. The transceiver module is configured for communication via the respective RAT and/or frequency band, i.e. configured for the associated service such as LTE, LTE-A with the UE. Such "eNB" may for example be represented by a macro eNB, a pico eNB and/or an LTE-LAN base station (BS).

Note that under an implementation aspect of the invention that is software "centric" rather than hardware "centric", respective modules may even be implemented as corresponding functional means (and without departing from the gist of the invention).

Note that herein below aspects of the invention are described with a focus on a source eNB (serving primary eNB prior to handover) as well as with a focus on a target eNB (serving primary eNB after handover). This, however, serves to keep the explanation simple. It is to be understood that in practice, each eNB (e.g. macro eNB) may take the role of a source as well as of a target eNB. Thus, it is to be understood that a device such as an eNB comprises/unites both functionalities at a time, as its role may change over time. Moreover, it may take both roles at a time, as an eNB may be a source eNB for a first terminal, e.g. user equipment UE1, but simultaneously may be a target eNB for another terminal, e.g. user equipment UE2.

Under a primary eNB aspect, an eNB represents a device, comprising a control module configured to control a communication module, the communication module being controlled to communicate with a terminal UE in association with at least a first other device (i.e. a secondary eNB), using at least two carriers (PCC and SCC), wherein at least a first carrier (PCC) towards the terminal is established from the device (primary eNB) and at least a second carrier (SCC) is established towards the terminal from the first other device (secondary eNB or base station).

Under a target eNB aspect, an eNB represents a device, comprising a control module configured to control a communication module, the communication module being controlled to communicate with a terminal UE in association with at least a first other device (i.e. a secondary eNB), using at least two carriers (PCC and SCC), wherein at least a first carrier (PCC) towards the terminal is to be established (during HO) from the device, and at least a second carrier (SCC) is established towards the terminal from the first other device (secondary eNB or base station).

Under secondary eNB (or secondary base station) aspect, such an eNB represents a device, comprising a control module configured to control a communication module, the communication module being controlled to communicate with a terminal UE in association with at least another device (source or target primary eNB), using at least two carriers (PCC, SCC), wherein at least a first carrier (PCC) towards the terminal UE is established from the at least one another device (serving or target primary eNB) and at least a second carrier (SCC) is established towards the terminal UE from the device; and an interface towards said another device, i.e. a backhaul interface to each of a source and target primary eNBs.

Now, method/signaling aspects in relation to such apparatuses or devices will briefly be outlined below and with reference to FIG. 3 as a comparative example. The method can be implemented using computer program products and/or software code portions executed by the control modules of the devices, which when execute perform those method steps.

Figure 3:
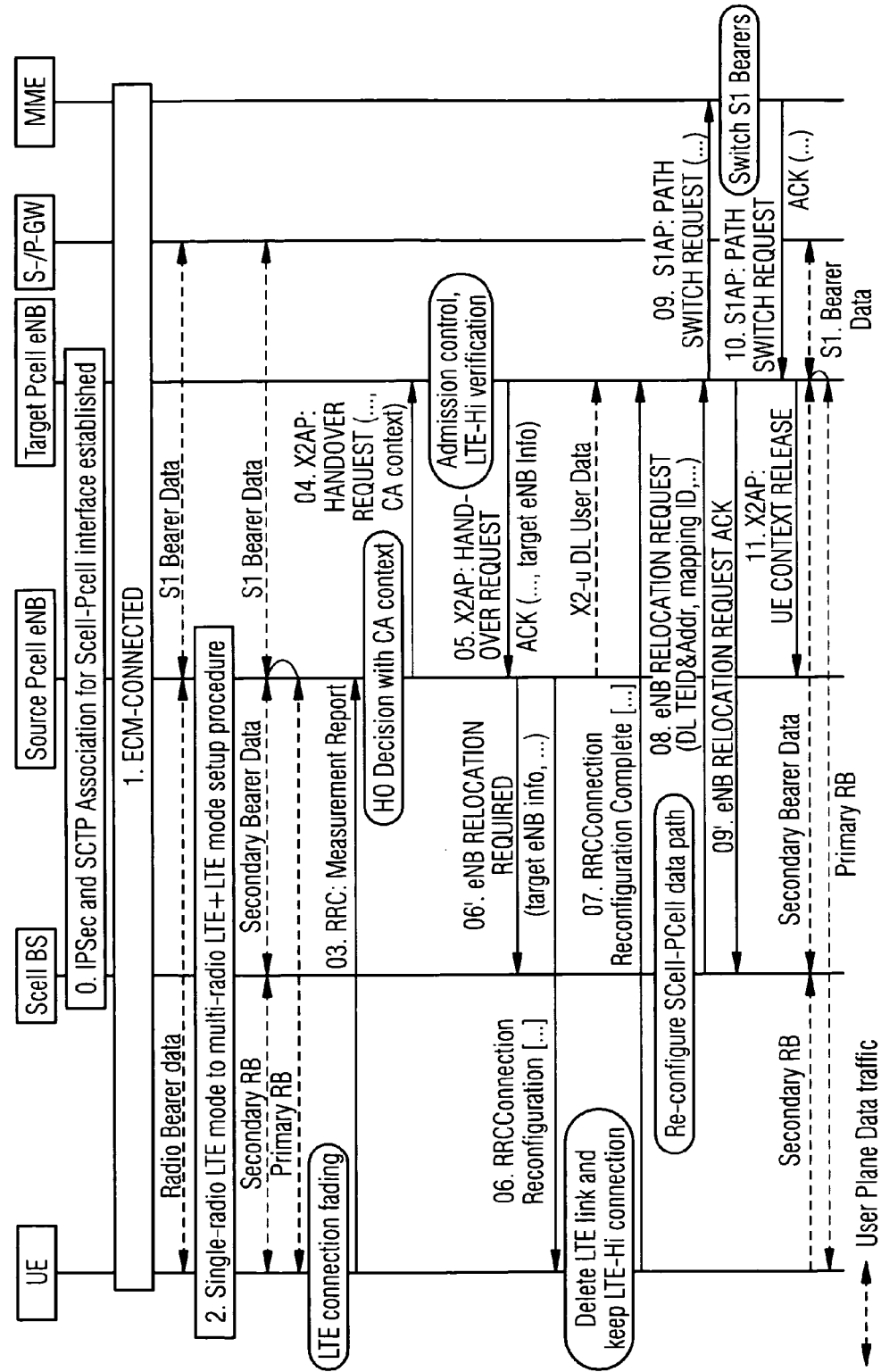
FIG. 3 illustrates a comparative example of a signaling for a PCell relocation procedure with carrier aggregation service continuation.

The entities involved and depicted in FIG. 3 are those as explained with reference to FIG. 1 already. Signaling exchanged is illustrated with the horizontal arrows, time/sequence of signaling is reflected by the vertical arrangement of the signals exchanged, and processing performed at a respective entity or apparatus is indicated in "boxes" allocated on the timeline of the respective entity.

The following signaling flow diagram in FIG. 3 illustrates a comparative example implementation of an optimized relocation procedure of a PCell in Inter Site Carrier Aggregation and Local Area offloading, where the ongoing secondary radio path services via the secondary base station will be continued alongside the target primary eNB. The proposed simultaneous data-path handling in LTE-Radio Handover and backhaul path switching between the secondary and primary base stations provides good performance and no or at least a shortest possible service break if Inter Site carrier aggregation is used.

In order to provide accurate synchronization, the primary eNBs measure and store the average transport delay of the backhaul interface between the secondary and primary base station. This is for example accomplished by using a Ping utility directed to the IP address of the secondary base station(s). (Note that each entity (apparatus or node) in such scenario is identifiable and addressable by an IP (internet Protocol) address associated thereto.)

In step 0, there are in advance established an IPSec and SCTP Associations for the backhaul interfaces, i.e. the secondary Base Station is prepared to have backhaul interfaces to multiple primary base stations.

In step 1, an evolved packet system connection management, ECM, is set up into connected state.

In step 2, the UE is moved to Inter Site Carrier Aggregation mode, i.e. there is a PCell via the primary base station and at least one SCell via the secondary base station.

In step 3, UE is sending a measurement report to the primary eNB, with an indication that the primary CC radio connection is fading, which results in that the primary eNB makes Inter eNB handover decision. And as a secondary CC is working well, it also decides to continue CA via the target primary eNB.

In step 4, a Message 4, Handover Request is used to deliver the required information in order to continue CA operation via the target eNB. For example, such message in step 4 includes secondary BS Identifier, based on which a target eNB is able to verify connectivity and respond accordingly to the source eNB in a subsequent message in a step 5. The message in step 4, for example, optionally also contains UE measurement results of an SCell, based on which the target eNB may verify if the SCell is working well enough in order to continue the CA operation. Now, if the target eNB cannot continue offloading/carrier aggregation, the source eNB issues a resource release request to the secondary base station. The target primary eNB prepares itself to receive the UE in handover and in addition to the current standardized information, it returns in step 5 in a message "Handover Request Ack" the required "target eNB Info", in order to enable the secondary BS to switch its backhaul interface towards the target primary eNB.

Upon reception of the message in step 5, the Source primary eNB sends first the message 6' to the secondary base station, and only thereafter then sends the message 6, delayed according to the current measured backhaul delay value, to the UE as an explicit radio handover command (for the UE) to the target PCell.

In this handover command, the UE is informed that the SCell configuration specific to the secondary base station remains despite the new PCell (i.e. the RRC is switched to a new eNB, but the User plane remains same through the SCell(s) of the secondary base station).

In a further comparative example, it is encompassed that in addition and prior to the message 6, the Source primary eNB has also sent message 6' in order to command the secondary BS to perform backhaul interface path switching between the primary base stations timely aligned with said radio handover. Among other information, the message 6' contains the mentioned "target eNB Info" which is required for the backhaul interface path switching in uplink direction in the secondary BS.

In a message 7, the UE indicates to the target Primary eNB the handover/relocation type (i.e. "the PCell relocation while certain SCell configuration remains"). In a similar manner like message 7 indicates successful UE movement to target PCell/eNB, the Secondary base station sends message 8 to indicate that a new Backhaul interface between primary and secondary base stations is to be established. This message 8 contains at least the required information to setup the downlink direction connectivity over the backhaul accordingly.

The target Primary eNB sends message 9 to the Secondary base station in order to indicate successful relocation procedure.

Thereafter, the inter site CA operation can continue via the target PCell/eNB by using new primary CC and intact secondary CC via the Secondary base station.

The remaining steps of the signaling flow are as usual in the X2 based handover. It should be noted that message 9' may return NACK (negative acknowledgement, Non-ACK) in case UE has not moved to the target PCell/eNB, i.e. a handover failure has happened. In such case, the Secondary base station may release CC resources locally.

The present scenario according to FIG. 3 is optimized to a large extent, considered to provide lossless packet delivery by using data forwarding in case of acknowledged-mode (AM) bearers, and enables reliable recovery from LTE Handover failure. As a result there is no tradeoff or compromise between performance versus robustness when compared with the basic X2-interface based Inter eNB Handover.

As mentioned, FIG. 3 thus shows one possible implementation of a signaling sequence in the context of such proposal.

The subsequently described examples of aspects of the present invention mainly revolve around the above outlined messages 6 and 6', and in particular the timing of the Secondary base station in terms of handling the air-interface scheduling and the user-plane protocol RLC of each bearer that it handles towards the UE.

Namely, assuming—like it is currently done—that also for bearers handled by the Secondary base station, the PDCP protocol (to whose functionalities the ciphering belongs to) is terminated at the Primary eNB, the handover of this Primary eNB implies that the ciphering keys of all bearers need to change, which in turn means that the RLC layer needs to provide—up to the PDCP layer—a clear distinction of which received packets have been ciphered with the key in use before the handover, and after which point (in time) packets have been ciphered with the key changed at handover.

In current LTE specifications, this is achieved by carrying out a jointly coordinated re-establishment procedure at both, PDCP and RLC layers. In turn, as is explained below, especially the RLC re-establishments at the peer entities on opposite ends of an air interface have a well-controlled timing. More precisely, no exchange of RLC PDUs should take place over the air interface at any time when the RLC re-establishment has been performed on one side; but not (yet) on the other.

In the above comparative example (FIG. 3), it is assumed (working assumption) that the Secondary base station and the UE react instantly to the received messages 6' and 6, respectively, and in order to properly synchronize the actions in response to these messages, after sending message 6' to the Secondary base station, the source primary eNB delays sending message 6 to the UE by an amount of time estimated by having observed round-trip times towards the Secondary base station.

This, however, does not guarantee that the resulting actions
i) at the UE (e.g. RRC_Connection_Reconfiguration procedure which involves received Mobility_Control_Information, and the related re-establishments/reset at PDCP/RLC/MAC layers respectively), and
ii) at the Secondary base station (at least RLC re-establishment is needed because, by the assumed PCell relocation to another (target) eNB, ciphering keys need to be changed at the next higher protocol layer i.e. PDCP), occur exactly simultaneously.

Namely, let it be assumed that the UE performs its actions before the Secondary base station, then at least the following problematic events can take place:

In downlink, at RLC:

After re-establishing its RLC entities, UE receives old packets (packets buffered at the Secondary base station before it performs re-establishment) with (radio link control sequence numbers) RLC SNs . . . , 0, 1, . . . N. From 0 onwards these progress the receiving (Acknowledged-mode, AM, bearers) or reordering (unacknowledged-mode, UM, bearers) window and the corresponding RLC SDUs (Service Data Units) are passed to upper layers (PDCP) where they fail to be deciphered (PDCP at the UE has changed the deciphering keys while the old packets were ciphered using the previous keys) and are discarded at IP layer. After the Secondary base station re-establishes its RLC entities, it starts sending new packets starting with RLC SN=0, but up to N, these are treated as out of window at the UE and hence discarded. For AM, based on the old packets, the UE will, however, indicate positive RLC-ACKs for all SNs 0, 1, . . . N to the Secondary base station. This means that the losslessness of AM bearers is lost on the air interface.

In downlink, UM bearer at PDCP:

When re-establishing its PDCP entities, UE performs "set Next_PDCP_RX_SN, and RX_HFN to 0". The old packets received after this may trigger this action:

"if received PDCP SN<Next_PDCP_RX_SN:
increment RX_HFN by one;".

Now, once PDCP packets numbered after the re-establishment at the target Primary eNB start coming in, there is HFN-desyncronization between the network and the UE, i.e. on this bearer, deciphering will always fail from now on.

In uplink.

Some of the first new RLC packets from the UE will be received by the Secondary base station before it has re-established RLC. After the Secondary base station does re-establish RLC, its received RLC SNs will not start from 0, like it expects, and UE will get RLC-NACKs concerning packets that the Secondary base station may have previously ACK'ed, and, hence, the UE has discarded. All this also breaks the losslessness of AM bearers.

If, on the other hand, the Secondary base station performs its actions before the UE, the problems stated above are still valid with the roles of UE and the applicable network-side entity exchanged (and hence "uplink" and "downlink" reversed).

In any case, in conclusion it seems necessary to further ensure proper timing of events at the UE and the Secondary base station at such a proposed procedure.

The subsequent aspects of the present invention represent a solution to this issue and, hence, propose corresponding measures to solve such problems.

In this regard, as outlined in FIG. 4, example aspects of the present invention encompass the following procedures.

Note that FIG. 4 resembles FIG. 3, and same entities are given the same names in FIG. 4. FIG. 4, though, starts in the illustration with message 3 (RRC measurement report) sent from the UE towards the serving (source) Primary eNB, which subsequently and responsive thereto, takes the handover decision to relocate the primary CC to another (target) Primary eNB.

Note further that message 6 and message 7 illustrated in FIG. 3 are inserted only as dotted signaling as reference in order to explain some timing interrelation to explain some timing related aspects of the examples of the invention.

Note also, that a small circle within the dotted signaling path of message 6 intends to denote that such message is relayed by the entity in whose time-line the circle is placed. That is, though FIG. 3 and FIG. 4 illustrate message 6 to be sent from the source Primary eNB to the UE, the circle intends to illustrate that the message 6 in an option can be sent to the Secondary base station (e.g. together with or encapsulated in another message), and from there is relayed to the terminal UE.

After those explanatory remarks as to the illustration and the meaning, the procedure is now explained.

To solve at least partly the above stated problems, as an example embodiment, events following the handover decision by the source Primary eNB may take place as indicated below, e.g. also in the following order.

i. As an option (this step could be omitted), the Source Primary eNB stops delivering downlink PDCP PDUs (RLC SDUs) to the Secondary eNB (this step is not absolutely necessary and could be omitted because delivering any further PDCP PDUs is useless as DL PDCP PDUs become discarded in the RLC re-establishment to follow))

ii. Secondary eNB suspends scheduling the UE on its air interface. (This stops all exchange of RLC PDUs between the Secondary eNB and the UE.)

iii. Secondary eNB performs RLC re-establishment on all bearers of this UE (thus performing a predefined re-establishment of one or more protocol entities communicating with their peer entities at the terminal).

This involves delivering any incomplete sequence (incomplete because not yet being delivered) of RLC SDUs received so far from the UE, up to the PDCP at the source Primary eNB. At any time after this, the Secondary eNB may also start buffering downlink RLC SDUs received from the target Primary eNB.

Also, actions related to the handover, including the PDCP/RLC re-establishments on all bearers, take place at the UE side, which requires that by this time, also the source Primary eNB has stopped scheduling the UE on its air interface.

iv. Secondary eNB may now resume scheduling the UE on its air interface, also resuming the exchange of RLC PDUs, now all created after the RLC re-establishments and ciphering-key changes at PDCP. Also the UE may engage in communication with the target Primary eNB, as in the current handover.

At least two signaling-message sequences can be considered to convey the necessary information among the Primary eNBs, the Secondary eNB, and the UE, to enable the above order of events.

Option 1:

As the last thing before sending message 6 to the UE (see FIG. 3), the source Primary eNB sends a message to the Secondary eNB indicating that it shall carry out its activities involved in steps ii), and then iii) above; after receiving message 7 from the UE, the target Primary eNB sends a message to the Secondary eNB indicating that it may carry out its share of step iv) above.

These messages may optionally be coupled with acknowledgements from their recipients.

Option 2:

Secondary eNB is involved to relay messages 6 and 7 (FIG. 3) towards the UE and the target Primary eNB, respectively.

The associated messages in downlink would be the last ones before the stopping of transmission/scheduling in steps i) and ii) above.

This may represent a layer violation, assuming that the Secondary eNB does not terminate RRC protocol for the UE. But the RRC messages 6 and 7 can, for example, be carried in containers of messages of another protocol used by the Secondary eNB to communicate towards the Primary eNBs, and these messages contain in addition the necessary instructions for the Secondary eNB itself to perform the necessary actions.

For message 7, this would represent a change to current specifications in that it would be sent by the UE to the same eNB as message 6 was received from.

Option 3:

Also a hybrid of the above options 1 and 2 is possible, e.g. to the extent that the Secondary eNB is informed of messages 6 and 7 using different options above, e.g. the Secondary eNB relays message 6 to the UE but learns about message 7 from the target Primary eNB: this would circumvent the last issue above.

Accordingly, as outlined above, there are presented examples for a synchronization of the user-plane switch at the UE and the serving Secondary eNB, when a PCell handover is performed from a source to a target Primary eNB. Introduction of additional eNB/RRC messages is one aspect of the invention, according to which message sequences or modifications of messages (sequences and/or contents) allows for full RLC/PDCP coordination at UE/secondary base station, when the given enhanced HO takes place (e.g. a correct timing sequence for certain actions and signaling in order the keep "ciphering state" in touch for each packet at both ends is enabled). As such, those new messages and/or signaling scheme is sent such that the RLC/PDCP layers are fully coordinated in UE and the secondary base station—in the context of an enhanced CA Handover where the Scell(s) in control of the secondary base station is not turned down and not needed to be re-configured.

Embodiments of the present invention may be implemented in software, hardware, application logic or a combination of software, hardware and application logic. The software, application logic and/or hardware generally reside on a memory module. A memory module may be a volatile or non-volatile memory module, such as a RAM, ROM, EPROM, EEPROM, or harddisk, or the like. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention relates in particular but without limitation to mobile communications, for example to environments under LTE, LTE-A, and subsequent releases thereof and can advantageously be implemented in user equipments or smart phones, or personal computers connectable to such networks.

That is, it can be implemented as/in chipsets to connected devices, and/or modems thereof. More generally, all products which are subject to a similar environment will see performance improvement with the invention being implemented thereto.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes a handover process in a carrier aggregation scenario, in which, from a viewpoint of a secondary eNB, there is encompassed a device, comprising a control module configured to control a communication module, the communication module being controlled to communicate with a terminal in association with at least another device, using at least two carriers, wherein at least a first carrier towards the terminal is established from the at least one another device and at least a second carrier is established towards the terminal from the device; and an interface towards said another devices, and wherein the control module is configured to suspend ongoing traffic between the device and the terminal on the second carrier, perform re-establishment of one or more protocol entities communicating over bearers between the device and the terminal on the second carrier, and resume traffic between the device and the terminal on the second carrier, wherein the suspending is triggered by a first instruction received from a first one of the at least one another device, and the resuming is triggered by a second instruction received. Corresponding source and target Primary eNBs as well as related methods and computer program products are likewise envisioned.

LIST OF EXEMPLARY ABBREVIATIONS/ACRONYMS USED

3GPP 3$^{rd}$ Generation Partnership Project
AP Access Point
BS Base Station
CA Carrier Aggregation
CC Component Carrier
eNB enhanced NodeB
EPC Evolved Packet Core
EPS Evolved Packet System
EUTRAN Evolved UMTS Terrestrial Radio Access Network
HeNB Home enhanced NodeB
HW Hardware
ID Identity
IP Internet Protocol
IPSec IP Security
LA Local Area
LTE Long Term Evolution
LAE Local Area Evolution
LAN Local Area Network MME Mobility Management Entity
NB NodeB
PCell Primary Cell
PDCP Packet Data Convergence Protocol
PLMN Public Land Mobile Network
SCell Secondary Cell
UE User Equipment
MS Mobile Station
WLAN Wireless Local Area Network
CATR China Academy of Telecommunication Research
MIIT Ministry of Industry and Information Technology (China)
ERAB Evolved Radio Access Bearer
SN Sequence Numbers
PDU Packet Data Units
SDU Service Data Units
HFN Hyper Frame Number
AM Acknowledged Mode
UM Unacknowledged Mode
PLMN Public Land Mobile Network
RADIUS Remote Authentication Dial In User Service
RAN Radio Access Network
RLC Radio Link Control
RRC Radio Resource Control
SAE System Architecture Evolution
SCTP Stream Control Transmission Protocol

What is claimed is:

1. A secondary radio access node comprising at least one processor and at least one memory module storing software code;
wherein under conditions in which:
at least a first carrier towards a terminal is established from a source primary radio access node and at least a second carrier is established towards the terminal from the secondary radio access node;
and there is a backhaul interface between the secondary and source primary radio access nodes,
the at least one memory module with the software code is configured with the at least one processor to cause the secondary radio access node to at least:
suspend ongoing traffic between the secondary radio access node and the terminal on the at least second carrier,
perform predefined re-establishment of one or more protocol entities communicating with their peer entities at the terminal, and
resume traffic between the secondary radio access node and the terminal on the at least second carrier,
wherein
the suspending is triggered by a first instruction received from the source primary radio access node, and
the resuming is triggered by a second instruction received.

2. The secondary radio access node according to claim 1, wherein the first instruction is a connection reconfiguration instruction addressed to the terminal,
and the at least one memory module with the software code is configured to cause the secondary radio access node further to
detect the connection reconfiguration instruction addressed to the terminal, and
responsive to the detecting relay the connection reconfiguration instruction to the terminal, and
trigger the suspending.

3. The secondary radio access node according to claim 1, wherein the second instruction is received from a target primary radio access node to which the terminal handed over from the source primary radio access node.

4. The secondary radio access node according to claim 1, wherein the second instruction received is a connection reconfiguration completion information addressed to a target primary radio access node to which the terminal handed over from the source primary radio access node,
and the at least one memory module with the software code is configured to cause the secondary radio access node further
to detect the reconfiguration completion information addressed to the target primary radio access node, and responsive to the detecting,
to relay the information to the target primary radio access node.

5. A system comprising the secondary radio access node according to claim 1, wherein the system further comprises the source primary radio access node and a target primary radio access node to which the terminal handed over from the source primary radio access node, wherein the target primary radio access node comprises:
at least one processor and at least one memory module storing software code for operating the target primary radio access node to send the second instruction to the secondary radio access node for triggering the secondary radio access node to resume traffic between the secondary radio access node and the terminal on the at least one second carrier.

6. A primary radio access node comprising at least one processor and at least one memory module storing software code,
wherein under conditions in which:
at least a first carrier towards a terminal is established from the primary radio access node and at least a second carrier is established towards the terminal from at least one secondary radio access node;
and there is a backhaul interface between the secondary and primary radio access nodes, the at least one memory module with the software code is configured with the at least one processor to cause the primary radio access node to at least:
during a handover process for the first carrier, send a first instruction to the at least one secondary radio access node for triggering the at least one secondary radio access node to suspend ongoing traffic between the at least one secondary radio access node and the terminal on the at least second carrier; wherein
said first instruction is sent in connection with sending a connection reconfiguration request pertaining to the first carrier to the terminal.

7. The primary radio access node according to claim 6, wherein the at least one processor and the at least one memory module with the software code is further configured to cause the primary radio access node to
stop scheduling ongoing traffic between the primary radio access node and the terminal on the first carrier after the first instruction and the reconfiguration request have been sent.

8. A method for operating a secondary radio access node, the method comprising
communicating with a terminal in association with a source primary radio access node, wherein at least a first carrier towards the terminal is established from the source primary radio access node and at least a second carrier is established towards the terminal from the secondary radio access node;

providing a backhaul interface towards said source primary radio access node, and suspending ongoing traffic between the secondary radio access node and the terminal on the at least second carrier, performing predefined re-establishment of one or more protocol entities communicating with their peer entities at the terminal, and resuming traffic between the secondary radio access node and the terminal on the at least second carrier, and
triggering the suspending by a first instruction received from the source primary radio access node, and
triggering the resuming by a second instruction received.

9. The method according to claim 8, wherein
the first instruction is a connection reconfiguration instruction addressed to the terminal, and the method further comprising
detecting the connection reconfiguration instruction addressed to the terminal, and
responsive to the detecting, relaying the connection reconfiguration instruction to the terminal, and triggering the suspending.

10. The method according to claim 8, further comprising
receiving the second instruction from a target primary radio access node to which the terminal handed over from the source primary radio access node.

11. The method according to claim 8, wherein
the second instruction received is a connection reconfiguration completion information addressed to a target primary radio access node to which the terminal handed over from the source primary radio access node, and the method further comprising
detecting the connection reconfiguration completion information addressed to the target primary radio access node, and responsive to the detecting relaying the connection reconfiguration completion information to the target primary radio access node.

12. At least one memory module storing computer-executable software code which, when run on a computer, are configured to cause the secondary radio access node to perform the method according to claim 8.

13. A method for operating a primary radio access node, the method comprising
communicating with a terminal in association with at least one secondary radio access node, wherein at least a first carrier towards the terminal is established from the primary radio access node and at least a second carrier is established towards the terminal from at least one secondary radio access node;
providing a backhaul interface between said at least one secondary radio access node and the primary radio access node,
and during a handover process for the first carrier,
sending a first instruction to the at least secondary radio access node for triggering the secondary radio access node to suspend ongoing traffic between the secondary radio access node and the terminal on the at least one second carrier; wherein
said first instruction is sent in connection with sending a connection reconfiguration request pertaining to the first carrier to the terminal.

14. The method according to claim 13, further comprising
stopping scheduling ongoing traffic between the primary radio access node and the terminal on the first carrier after the first instruction and the reconfiguration request were sent.

15. At least one memory module storing computer-executable software code which, when run on a computer, are configured to cause the primary radio access node to perform the method according to claim 13.

* * * * *